United States Patent
Bhattacharjee et al.

(10) Patent No.: US 9,442,837 B2
(45) Date of Patent: Sep. 13, 2016

(54) ACCELERATING MULTIVERSION CONCURRENCY CONTROL USING HARDWARE TRANSACTIONAL MEMORY

(71) Applicant: International Business Machines Corporation, Armonk, NY (US)

(72) Inventors: Bishwaranjan Bhattacharjee, Yorktown Heights, NY (US); Mustafa Canim, Ossining, NY (US); Mohammad S. Hamedani, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/623,656

(22) Filed: Feb. 17, 2015

(65) Prior Publication Data

US 2016/0239410 A1 Aug. 18, 2016

(51) Int. Cl.
*G06K 5/00* (2006.01)
*G06F 12/02* (2006.01)
*G06F 9/46* (2006.01)

(52) U.S. Cl.
CPC ............. *G06F 12/023* (2013.01); *G06F 9/467* (2013.01); *G06F 2212/251* (2013.01)

(58) Field of Classification Search
USPC ........ 235/380, 375, 492, 487, 379; 707/695, 707/704
See application file for complete search history.

(56) References Cited

U.S. PATENT DOCUMENTS

| | | | |
|---|---|---|---|
| 7,168,612 B2* | 1/2007 | Montgomery | G06F 9/466 235/379 |
| 2009/0319486 A1* | 12/2009 | Surlaker | G06F 17/30551 |
| 2011/0137962 A1 | 6/2011 | McKenney et al. | |
| 2011/0219208 A1* | 9/2011 | Asaad | G06F 15/76 712/12 |
| 2012/0011106 A1* | 1/2012 | Reid | G06F 9/466 707/695 |
| 2014/0040554 A1 | 2/2014 | Pohlack et al. | |
| 2015/0006466 A1* | 1/2015 | Tonder | G06F 17/30359 707/602 |
| 2015/0088822 A1* | 3/2015 | Raja | G06F 17/30324 707/625 |
| 2015/0261805 A1* | 9/2015 | Lee | G06F 17/30353 707/703 |
| 2015/0278281 A1* | 10/2015 | Zhang | G06F 9/466 707/703 |

OTHER PUBLICATIONS

Bernstein et al., "Concurrency Control and Recovery in Database Systems," Jan. 1987, Addison-Wesley Publishing Company, Addison-Wesley Series in Computer Science.
Cahill et al., "Serializable Isolation for Snapshot Databases," SIGMOND '08 Proceedings of the 2008 ACM SIGMOND International Conference on Management of Data, Jun. 9-12, 2008, pp. 729-738.
Mohan et al., "ARIES: A Transaction Recovery Method Supporting Fine-Granularity Locking and Partial Rollbacks Using Write-Ahead Logging," ACM Transactions on Database Systems, vol. 17, No. 1, Mar. 1992, pp. 94-162.
Larson et al., "High-Performance Concurrency Control Mechanisms for Main-Memory Databases," Proceedings of the VLDB Endowment, vol. 5, No. 4, 2011, pp. 298-309.
Cain et al., "Robust Architectural Support for Transactional Memory in the Power Architecture," ICSA '13, Proceedings of the 40th Annual International Symposium on Computer Architecture, vol. 41, Issue 3, Jun. 2013, pp. 225-236.
Sadoghi et al., "Reducing Database Locking Contention Through Multi-Version Concurrency," Proceedings of the VLDB Endowment, vol. 7, Issue 13, Aug. 2014, pp. 1331-1342.

* cited by examiner

*Primary Examiner* — Edwyn Labaze
(74) *Attorney, Agent, or Firm* — David Zwick

(57) ABSTRACT

Atomically updating shared data in a transactional memory system comprising transactional memory storage and a transactional memory enabled processor. The computer creates a pointer stored in a stable memory location that is used to locate a shared data stored in a second memory location. The computer accesses the shared data and loads the pointer used to locate the accessed shared data into transactional memory storage. The computer updates the accessed shared data using copy-on-write, whereby the updated shared data is stored in a third memory location, and performs the atomic update of the shared data by updating the pointer such that it locates the updated shared data stored in the third memory location.

8 Claims, 6 Drawing Sheets

ACCELERATING MULTIVERSION CONCURRENCY CONTROL USING HARDWARE TRANSACTIONAL MEMORY

BACKGROUND

The present disclosure relates generally to managing multi-version data record concurrency and more particularly to accelerating multi-version concurrency control using hardware transactional memory.

A multi-version application, such as a multi-version database, manages multiple versions of its data records. The multi-version database stores both current data records and historical data records in rows of a relational data table. The rows are typically annotated with timestamps representing the time period during which a row is valid or was valid. In a multi-version database system, new data records do not physically replace old ones. Instead, a copy-on-write protocol generates a new version of a data record, which becomes visible to other transactions at commit time. Conceptually, many rows for a data record may exist, each row corresponding to a state of the multi-version database at some point in time. Older versions of data records may be garbage-collected as the need for the older versions diminishes, in order to reclaim space for new data records.

SUMMARY

Embodiments of the present invention disclose a method, computer program product, and system for atomic update of shared data in a transactional memory system comprising transactional memory storage and a transactional memory enabled processor. The computer creates a pointer stored in a stable memory location that is used to locate a shared data stored in a second memory location. The computer accesses the shared data and loads the pointer used to locate the accessed shared data into transactional memory storage. The computer updates the accessed shared data using copy-on-write, whereby the updated shared data is stored in a third memory location, and performs the atomic update of the shared data by updating the pointer such that it locates the updated shared data stored in the third memory location.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
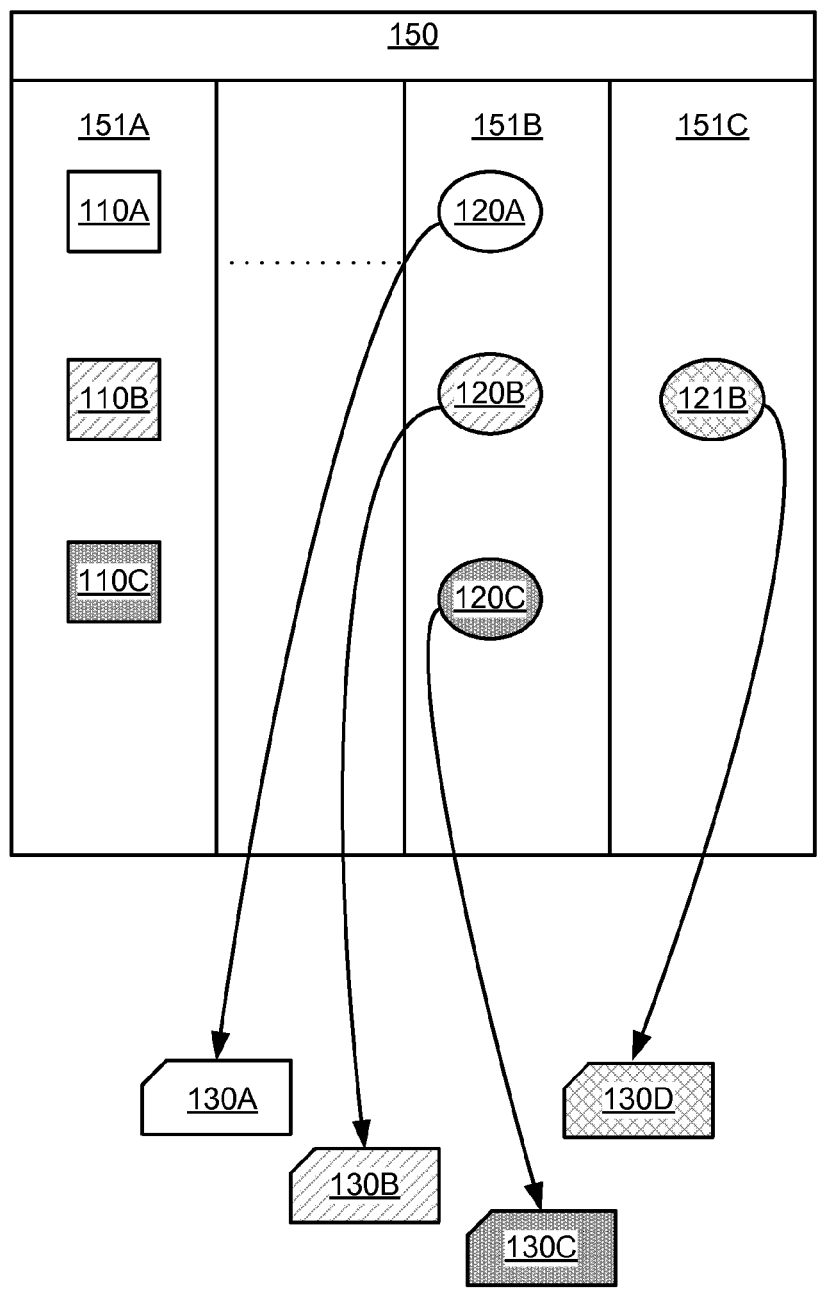
FIG. 1 depicts a concurrency control structure, in accordance with an embodiment of the present disclosure.

Embodiments of the present disclosure provide concurrency control schemes utilizing hardware transactional memory to control simultaneous access to shared data in applications that create shared data files and maintain multiple versions of the data within the file. These applications, multi-version applications, may manage multiple, simultaneous accesses to the file, hereinafter "concurrency control", by providing a program with a snapshot of the file data and isolating the snapshot version of the file data from other versions of the file data actively being modified or deleted. Isolation may be accomplished by creating a new data record when any data within that data record is modified, rather than storing the modified data record in-place or overwriting deleted data records.

In a typical multi-version application, control concurrency may be accomplished with a two-version (2V)-Indirection mapping to further isolate versions. A 2V-Indirection mapping may include a version-independent logical identifier (LID) that references a data record in a file or database. An LID may be an abstract reference to the data record, such as an index value resulting from a hashing function or a file offset. The LID may be translated, for example with a translate table, into a version-dependent record identifier (RID), or in a multi-version database a version-dependent row identifier. The RID may correspond with the physical memory location of the data record. The LID value for any particular data record may remain unchanged for the life of the file or database, with only the translate table being modified when a new version of the data record is written to a new physical storage location or when the record is deleted.

With 2V-Indirection mapping, committing a modified data record to memory may include creating a new version of that data record, storing the new version of the data record in memory, and updating the translate table to associate the existing LID (for that data record) with the RID of the newly stored version of the data record. Translate table entries for unchanged data records may remain unchanged. This level of indirection may allow multiple RIDs to exist for any given data record, each RID corresponding with a physical memory location of one version of the data record, but the LID translation may only translate to the most recently committed version of the data record in physical memory.

A kV-Indirection structure may extend the concurrency control of 2V-Indirection mapping to multi-version-Indirection mapping by associating one LID with a plurality of versions of a data record. A typical multi-version application using a kV-Indirection structure may translate one LID, for example with a translate table, into any one of the plurality of RIDs associated with the LID in order to locate the desired version of the data record. The plurality of RIDs may include a "committed RID (cRID)" that locates the most recently committed version of the data record and an "uncommitted RID (uRID)" that locates a modified, but as yet uncommitted version of the data record. Multi-version-Indirection mapping that includes an LID translation to either a cRID or uRID may support multi-version concurrency control traditionally handled with two-version, two-phase locking (2V2PL) by enabling efficient direct access to both the last committed and the last uncommitted versions of a data record. In certain embodiments, the translate table may only support the translation of the LID to the most recently committed version of the data record (cRID) without translating the LID to other versions of the data record.

In other embodiments, the translate table may support kV-Indirection and translate the LID to any of the last k versions of the data record.

FIG. 1 depicts a concurrency control structure, in accordance with an embodiment of the present disclosure. The concurrency control structure depicted may be a multi-version-Indirection mapping in which data records 130A, 130B, 130C, 130D may be committed versions of an application's data records or may be modified, but not yet committed versions of an application's data records. Data records 130 may be application data in, for example a file or database. The data records 130 may be, for example, organized in rows and columns as in a relational data table, organized as an array, organized as a linked list, or organized in any manner best utilized by the multi-version application. Data records 130 may be stored, for example, on a computer readable storage medium, such as computer readable storage medium (media) 530 (FIG. 5), portable computer readable storage medium (media) 570, and/or RAM(S) 522.

In various embodiments, the physical storage location of each data record 130 may be represented by a RID 120A, 120B, 120C, 121B. RID 120, 121 values, corresponding to the physical memory location of a version of a data record 130, may change when a transaction actively acts upon or commits that associated data record 130, however, the RIDs 120, 121 themselves may be stored as stable pointers, i.e., in persistent memory addresses that do not change with the changing versions of a data record 130. RID 120, 121 may be stored, for example, on a computer readable storage medium, such as computer readable storage medium (media) 530 (FIG. 5), portable computer readable storage medium (media) 570, and/or RAM(S) 522.

In various embodiments, the multi-version-Indirection mapping structure includes version independent LIDs 110A, 110B, 110C which may indirectly reference the application data records 130. Each LID 110 references a data record 130 without regard to the version of the data record 130. In other words, a version-independent LID 110 identifies a particular data record 130, for example within a file or database, but does not identify the particular version of that data record 130. Version independent LIDs 110 may be used to reference a plurality of versions of data records 130 from which the application may select. In various embodiments, an LID 110 may reference a data record 130 in a file, in a row of data records 130 in a database, or in a column of data records 130 in data table. LIDs 110 may be stored as a table, an array, a linked list, a tree or any other structure readily accessible to a multi-version application.

In various embodiments, LIDs 110 may be stored on persistent storage such as magnetic hard disc drive (HDD), flash memory, rewritable optical disk, rewritable magnetic tape, or other computer readable storage medium, such as computer readable storage medium (media) 530 (FIG. 5), portable computer readable storage medium (media) 570, and/or RAM(S) 522. LIDs 110 may be stored as stable pointers, i.e., in persistent memory addresses that do not change for the life of the file or database.

In various embodiments, a translate table 150 may be used to translate an LID 110 into an RID 120, 121 to locate the data record 130 in physical memory. Translate table 150 may include the RIDs 120, 121 for all versions of data records 130. Translate table 150 may be arranged, for example as a table, an array, a linked list, a hashtable, a tree, or any other index structure. Exemplary translate table 150 is depicted as a table that includes a column 151A comprising an entry for each LID 110 referencing a data record 130 in a file or database, a column 151B comprising an entry for each cRID 120 representing currently committed data records 130A, 130B, 130C, and a column 151C comprising an entry for each uRID 121 representing currently modified, but as yet uncommitted data records 130D.

As new data records 130 are added to a file or database and committed to memory, a new LID 110 and cRID 120 may be added to translate table 150. As existing data records 130 are modified, the modified version of the data record 130D may be written to a new memory location and a new uRID 121 may be added to the translate table 150 and associated with the existing LID 110 for that data record. The application may now directly locate the physical memory location of the modified, yet uncommitted, data record 130D as well as the most recently committed version of the data record 130B. When committing the modified data record 130D, the current uRID 121B value may be copied into the cRID 120B, in the translate table 150, for that data record 130 and the uRID 121B value may be set to NULL. The (LID, cRID, uRID) triplet for a particular data record 130 represents a conceptual and logical connection. In certain embodiments, the translate table 150 may include only columns 151A and 151B creating an (LID, cRID) pair that may translate the LID 110 only into the most recently committed version of the data record (cRID 120) and maintain stable pointers only to the LID 110 and cRID 120. In other embodiments, translate table 150 may include k columns 151 creating a (LID, cRID, RID(1), RID(2), . . . , RID(k)) set that may translate the LID 110 to any of the last k versions of the data record 130 and maintain stable pointers to the LID 110 and the RIDs 120, 121 for last k versions of the data record 130.

The (LID, cRID, uRID) triplet does not dictate that translate table 150 must be physically extended to preallocate enough space for the LIDs 110 or uRIDs 121. The LIDs 110 may be maintained as a separate structure and the translate table 150 may maintain uRIDs 121 only for an active set of transactions to reduce space overhead.

Translate table 150 may be stored on persistent storage such as a magnetic hard disc drive (HDD), a flash memory, a rewritable optical disk, a rewritable magnetic tape, or other computer readable storage medium, such as computer readable storage medium (media) 530 (FIG. 5), portable computer readable storage medium (media) 570, and/or RAM(S) 522. Access to translate table 150 may be accelerated by storing translate table 150 in storage-class memory such as a phase change memory (PCM) and/or a solid-state drive (SSD), due to storage-class memory's lower access time and smaller latency compared to persistent storage. A phase change memory is a non-volatile solid-state data storage memory device employing phase change materials that change between two states, namely an amorphous state and a poly-crystalline state. A solid-state drive uses integrated circuit assemblies as memory to store data persistently.

Multi-version-Indirection mapping may allow concurrent readers to access the currently committed versions of each data record 130A, 130B, 130C using the cRID 120, without interfering with concurrent writers. Similarly, concurrent writers may be able to insert an updated, uncommitted version of a data record 130D using the uRID 121, without blocking concurrent readers. During transaction validation, the transaction readset may be verified by checking the current (LID, cRID). If the cRID 120 has changed, the transaction may be aborted, as the version of the data record 130 read may no longer match the current version of that data record 130.

Leveraging hardware transactional memory allows the transactional memory system to handle data record 130 conflicts, rather than the data record 130 conflicts being handled by the application, thus simplifying and accelerating a multi-threaded or multi-version application's concurrency control. Hardware transactional memory may replace software concurrency control, such as verifying that a previously read data record 130 is still unmodified prior to committing a transaction and blocking a transaction with a lock.

Embodiments of the present disclosure provide a mechanism by which the complexity of concurrency control is removed from the application and handled by the transactional memory system. The provided mechanism manipulates pointers to data rather than the data itself, allowing transactional memory to be used for concurrency control without regard to the size of the data records 130 or indexes accessed during a transaction. The present disclosure supports applications with either an optimistic or pessimistic concurrency control scheme, provided the application's concurrency control structure includes stable pointers, such as those found in multi-version-Indirection mapping structures, to its data records 130.

Various embodiments of the present invention combine stable pointers to data records 130 with "suspend" and "resume" computer architected transaction extensions to the instruction set architecture to limit the amount of data stored in transactional memory for a transaction. A suspend instruction executed within a transaction may indicate to the transactional memory system to stop loading accessed data into transactional memory. The resume instruction indicating to the transactional memory system to resume loading accessed data into transactional memory.

Figure 2:
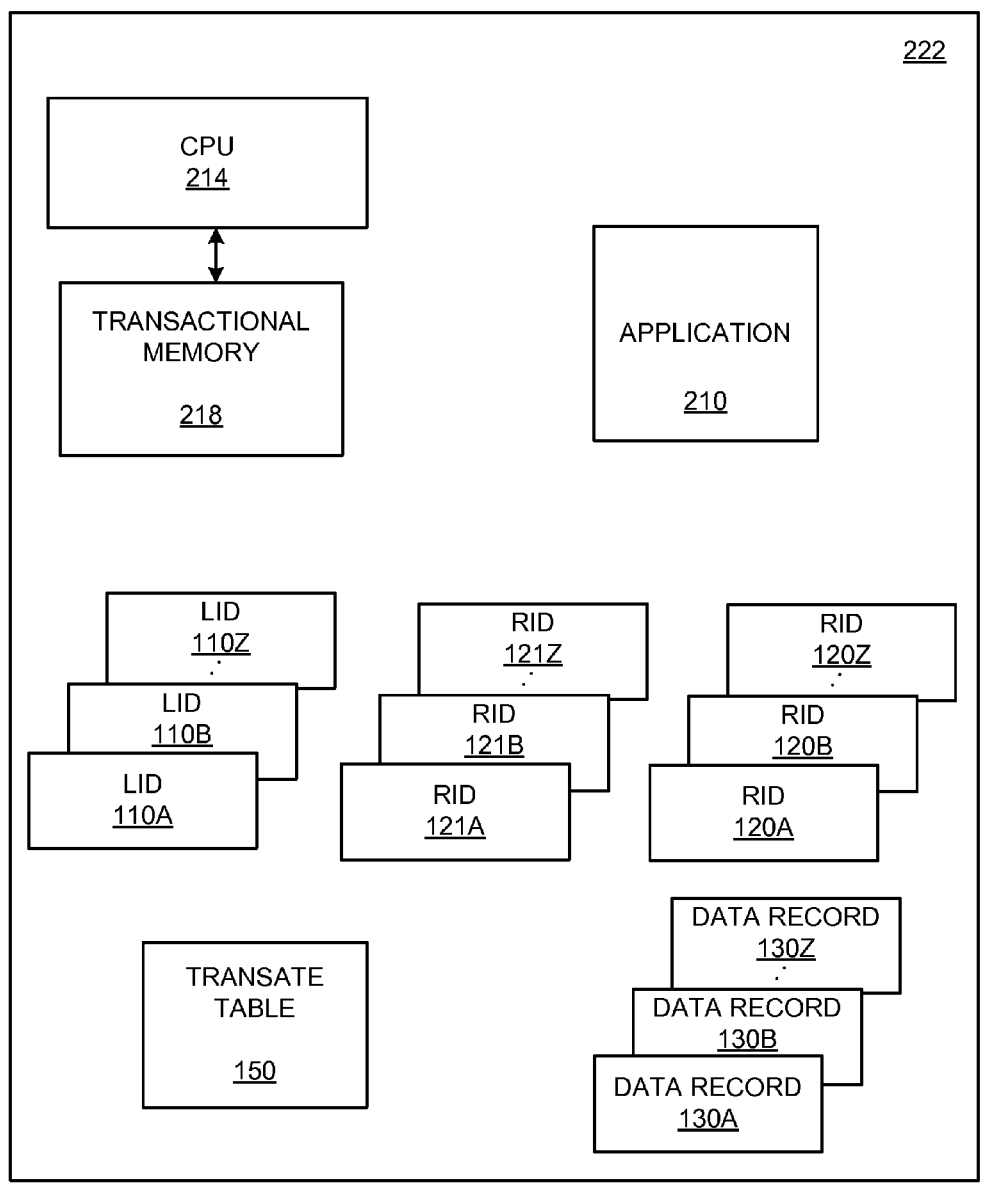
FIG. 2 illustrates a functional block diagram of an exemplary transactional memory system, in accordance with an embodiment of the present disclosure.

FIG. 2 illustrates a functional block diagram of an exemplary transactional memory system, in accordance with an embodiment of the present disclosure. The transactional memory system may be a computing device 222 (FIG. 5) that includes one or more central processing units (CPU) 214, one or more transactional memories 218, one or more multi-version applications 210, one or more LIDs 110A-110Z (FIG. 1) referencing one or more RIDs 120A-120Z, 121A-121Z pointing to one or more stored data records 130A-130Z, and one or more translate tables 150, all of which may be stored, for example, on a computer readable storage medium, such as computer readable storage medium (media) 530 (FIG. 5), portable computer readable storage medium (media) 570, and/or RAM(S) 522.

In various embodiments, the one or more CPUs 214 (FIG. 5) may be transactional memory enabled which may allow multi-version application 210 to define specified code regions (also referred to as "transactional regions" or just "transactions") that are executed transactionally by computing device 222. If the transactional execution completes successfully, then all memory operations performed within the transactional region will appear to have occurred instantaneously when viewed from other CPUs 214. The CPU 214 makes the memory operations of the executed transaction, performed within the transactional region, visible to other CPUs 214 only when a successful commit occurs, i.e., when the transaction successfully completes execution. In various embodiments, CPU 214 may support transactional memory architectural extensions that support program instructions within a transactional region to both suspend the transaction and to resume the suspended transaction. The CPU 214 may discontinue loading accessed data into transactional memory 218 between the suspend instruction and the subsequent resume instruction. CPU 214 may resume loading accessed data in transactional memory 218 following the resume instruction until another suspend instruction is encountered in the transactional region or the transactional region ends. Although transactions may be supported with hardware, software, microcode or any combination of the above to implement data isolation, exemplary embodiments of the present disclosure will be described using hardware transactional memory.

In various embodiments, transactional memory 218 may include read and write sets for transactions. A transactional memory system may track data stores and assemble a write-set for the transaction, the actual write-set data may be buffered in transactional memory 218 until the end of the transaction. When the transaction successfully commits its data, all the stores in the write-set become globally visible in an atomic fashion, typically by writing the buffered data to a cache. Alternatively, if the transaction aborts, then the buffered stores must be discarded, without modifying actual memory locations of the data. Transactional memory 218 may track data reads by creating a read-set in transactional memory 218. A successful transaction may simply write all the reads belonging to a read-set, to the register file. Transactional memory systems may ease multi-threaded programming by guaranteeing that transactional regions execute atomically and in isolation.

In various embodiments, application 210 may be a multi-threaded or multi-version application capable of running a plurality of simultaneous instances or programs on the one or more CPUs 214, each instance or program sharing common data. Various embodiments of application 210 may control concurrency to shared data with data versioning, transactional regions, 2V-Indirection or multi-version-Indirection mapping, locking, or any combination of the above. Exemplary embodiments of the present disclosure depict application 210 utilizing kV-Indirection mapping in conjunction with transactional memory 218 to control concurrency among the plurality of application 210 instances or programs sharing data.

Computing device 222 represents a computing device, system or environment, and may be a laptop computer, notebook computer, personal computer (PC), desktop computer, tablet computer, thin client, mobile phone or any other electronic device or computing system capable of performing the required functionality of embodiments of the disclosure. Computing device 222 may include internal and external hardware components, as depicted and described in further detail with respect to FIG. 5. In other various embodiments of the present disclosure, computing device 222 may represent a computing system utilizing clustered computers and components to act as a single pool of seamless resources. In general, computing device 222 is representative of any programmable electronic devices or combination of programmable electronic devices capable of executing machine-readable program instructions in accordance with an embodiment of the disclosure.

Figure 3A:
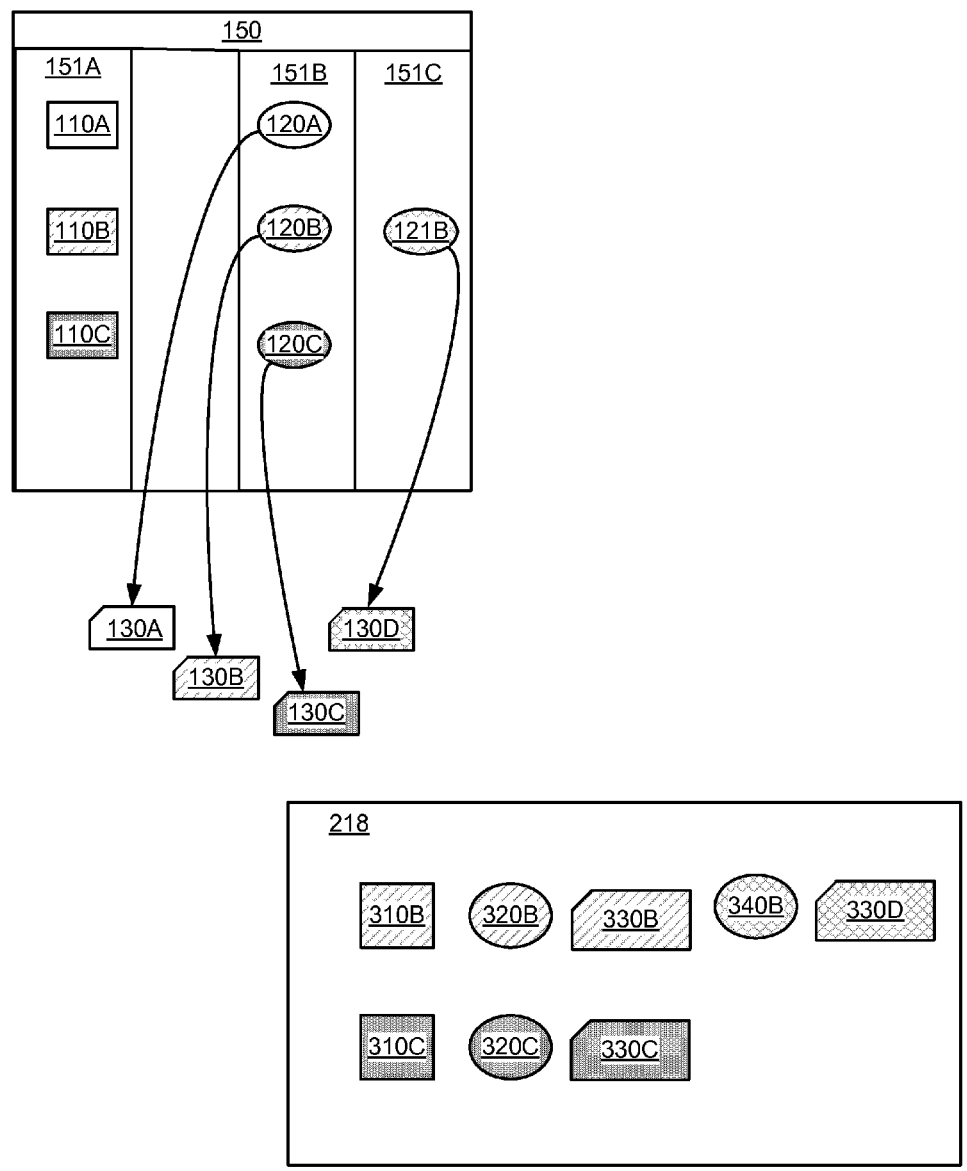
FIGS. 3A and 3B depict transactional memory usage, in accordance with an embodiment of the disclosure.
Figure 3B:
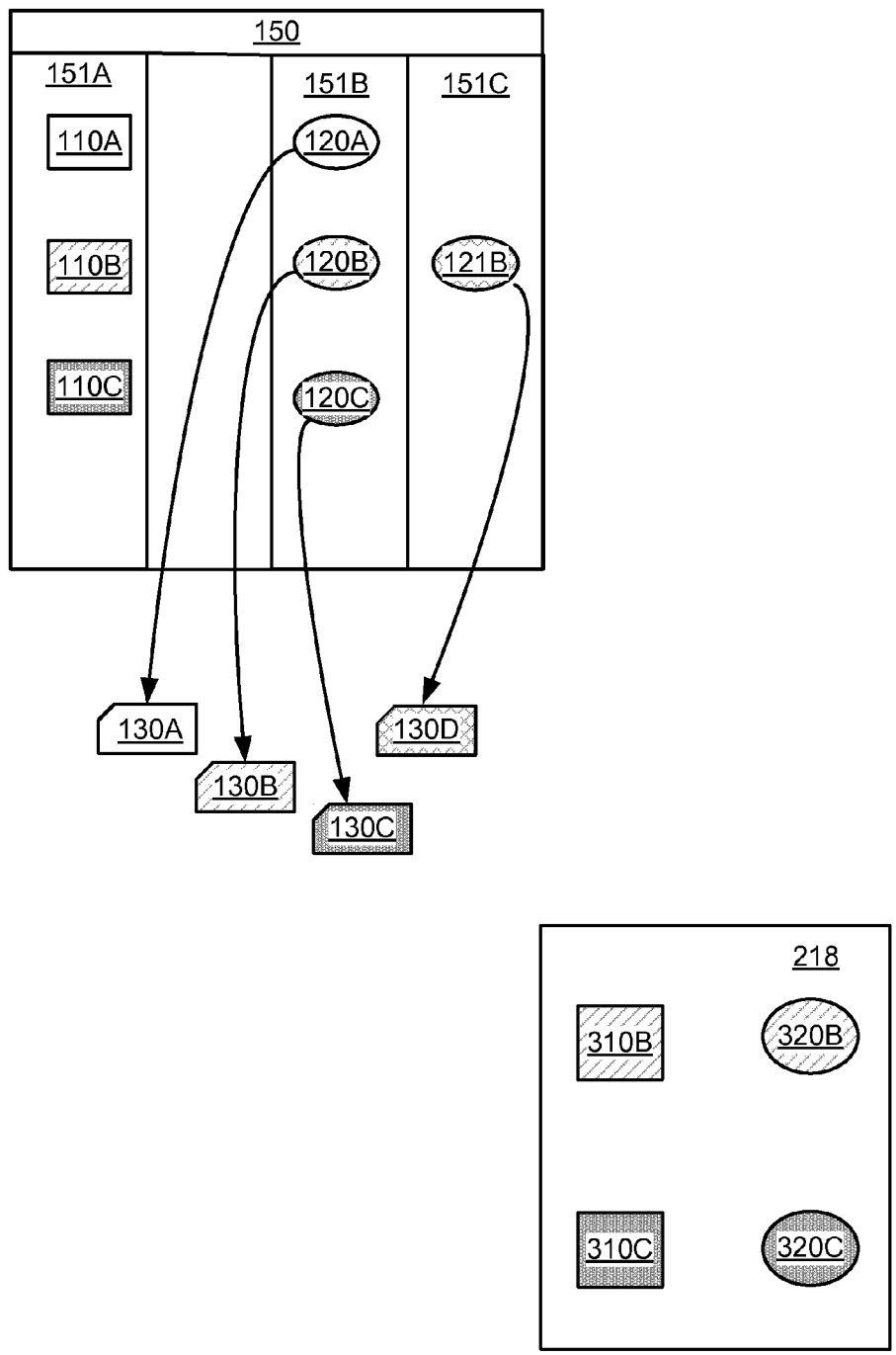

FIGS. 3A and 3B depict transactional memory usage, in accordance with an embodiment of the disclosure.

FIG. 3A depicts transactional memory usage for the exemplary pseudo code segment represented by Table 1. The exemplary pseudo code segment of Table 1 includes an update transaction from an application 210 that utilizes kV-Indirection mapping for concurrency control.

TABLE 1

Update Transaction Example

```
TXBEGIN (begin transaction)
.
.
.
locate LID for data record (130B)
READ LID (110B)
translate LID (110B) into cRID ( 120B)
READ cRID (120B)
READ data record (130B)
.
.
.
MODIFY data record (130B)
WRITE modified data record (130D)
CREATE uRID for data record (130D)
WRITE uRID (121B)
.
.
.
locate LID for data record (130C)
READ LID (110C)
Translate LID (110C) into cRID ( 120C)
READ cRID (120C)
READ data record (130C)
.
.
.
COMMIT
TXEND (end transaction)
```

TABLE 2

Update Transaction Example Using SUSPEND/RESUME

```
TXBEGIN (begin transaction)
.
.
.
locate LID for data record (130B)
READ LID (110B)
translate LID (110B) into cRID ( 120B)
READ cRID (120B)
SUSPEND
READ data record (130B)
.
.
.
MODIFY data record (130B)
WRITE modified data record (130D)
CREATE uRID for data record (130D)
WRITE uRID (121B)
.
.
.
RESUME
locate LID for data record (130C)
READ LID (110C)
Translate LID (110C) into cRID ( 120C)
READ cRID (120C)
SUSPEND
READ data record (130C)
.
.
.
RESUME
COMMIT
TXEND (end transaction)
```

The exemplary update transaction of Table 1 locates the committed version of data record 130B by determining the (LID,cRID) translation for the data record. Because both LID 110B and cRID 120B are accessed by the transaction, they may be included in transactional memory 218 as LID 310B and cRID 320B respectively along with the accessed data record 130B, stored in transactional memory 218 as data record 330B. The transaction then modifies data record 130B, writes the modified data record 130D to a new memory location, creates a new uRID 121B to point to the new memory location, and writes uRID 121B to memory. Both the modified, uncommitted data record 130D and the uRID 121B may be added to transactional memory 218, as data record 330D and uRID 340B respectively. The exemplary transaction continues and reads additional data record 110C causing LID 110C, cRID 120C and data record 130C to be included in transactional memory 218 as LID 310C, cRID 320, and data record 330C respectively.

Depending on the size of transactional memory 218 and the size of data records 330, LIDs 310 and RIDs 320, 340 stored in transactional memory 218, the transactional memory system may abort the transaction, due to lack of transactional memory 218 space.

FIG. 3B depicts transactional memory usage for the exemplary pseudo code segment represented by Table 2. The exemplary pseudo code segment of Table 2 includes the same transaction as Table 1, but from an application 210 that combines kV-Indirection mapping structure for concurrency control with suspend and resume transaction instructions to limit the amount of data stored in transactional memory 218.

The exemplary update transaction of Table 2 locates the committed version of data record 130B by determining the (LID,cRID) translation for the data record while in transaction mode. Because both LID 110B and cRID 120B are accessed by the transaction, they may be included in transactional memory 218 as LID 310B and cRID 320B respectively. The transaction then executes a suspend instruction to suspend transaction mode. Any data accessed while transaction mode is suspended will not be loaded into transactional memory 218. In the exemplary transaction, accessed data record 130B, modified, but uncommitted data record 130D and created uRID 121B may not be included in transactional memory 218. The exemplary transaction resumes transaction mode prior to accessing the LID 110C and cRID 120C needed to locate data record 130C, but again suspends transaction mode prior to accessing the actual data record 130C. Only the LID 11C and cRID 120C may be included in transactional memory 218 as LID 310C and cRID 320C respectively. Adding suspend and resume program instructions in a transaction may limit the data placed in transactional memory 218 to include only the stable concurrency control pointers, thus allowing applications 210 with large data records 130 to utilize hardware transactional memory 218 to simplify and accelerate concurrency control.

When the exemplary transaction of Table 2 commits updated data record 130D, the stable concurrency control pointer cRID 120B changes. Any concurrent transaction whose transactional memory 218 readset included the old LID 110B and cRID 120B, as a result of accessing the old committed data record 130B, may be aborted through transactional memory protocol.

In certain embodiments, an application's 210 concurrency control may allow concurrent transactions to read modified, but uncommitted data records 130. In these embodiments the stable pointer, such as uRID 121, may also be maintained in the transactional memory 218 of the reading transaction. When the update transaction commits the transaction and the uRID 121 value is copied into the cRID and the uRID value is set to null, any concurrent readers of the modified, but uncommitted data records may be aborted.

In various embodiments, a multi-threaded or multi-version application 210 may manually program suspend and resume instructions within their transactions. In other embodiments, a compiler may generate a transaction that includes suspend and resume program instructions for a multi-version applications that use stable pointers for concurrency control. In this embodiment, a compiler option may be set by the application programmer to indicate suspend and resume instructions are desired in the transactional region. In certain other embodiments, microcode or hardware in the transactional memory system may automatically suspend transaction mode before accessing data records 130. In this embodiment, a new "transaction begin" instruction or a new option on an existing transaction begin instruction may signal the transactional memory system that accessed data records 130 are not to be included in transactional memory 218. In certain embodiments, the transactional memory system may provide a new operator on existing load instructions to indicate whether the data loaded by the instruction is to be placed in transaction memory 218. In other embodiments, the transactional memory system may support new load instructions which do not store the data loaded in transactional memory 218.

Various embodiments of the present disclosure may ease and accelerate concurrency control by utilizing hardware transactional memory 218 to recognize and handle data record 130 conflicts, regardless of the size of the data records 130 by employing the ability to "suspend" storing data into transactional memory 218 and to later "resume" storing data into transactional memory 218 in machines supporting such extensions to the instruction set architecture.

Figure 4:
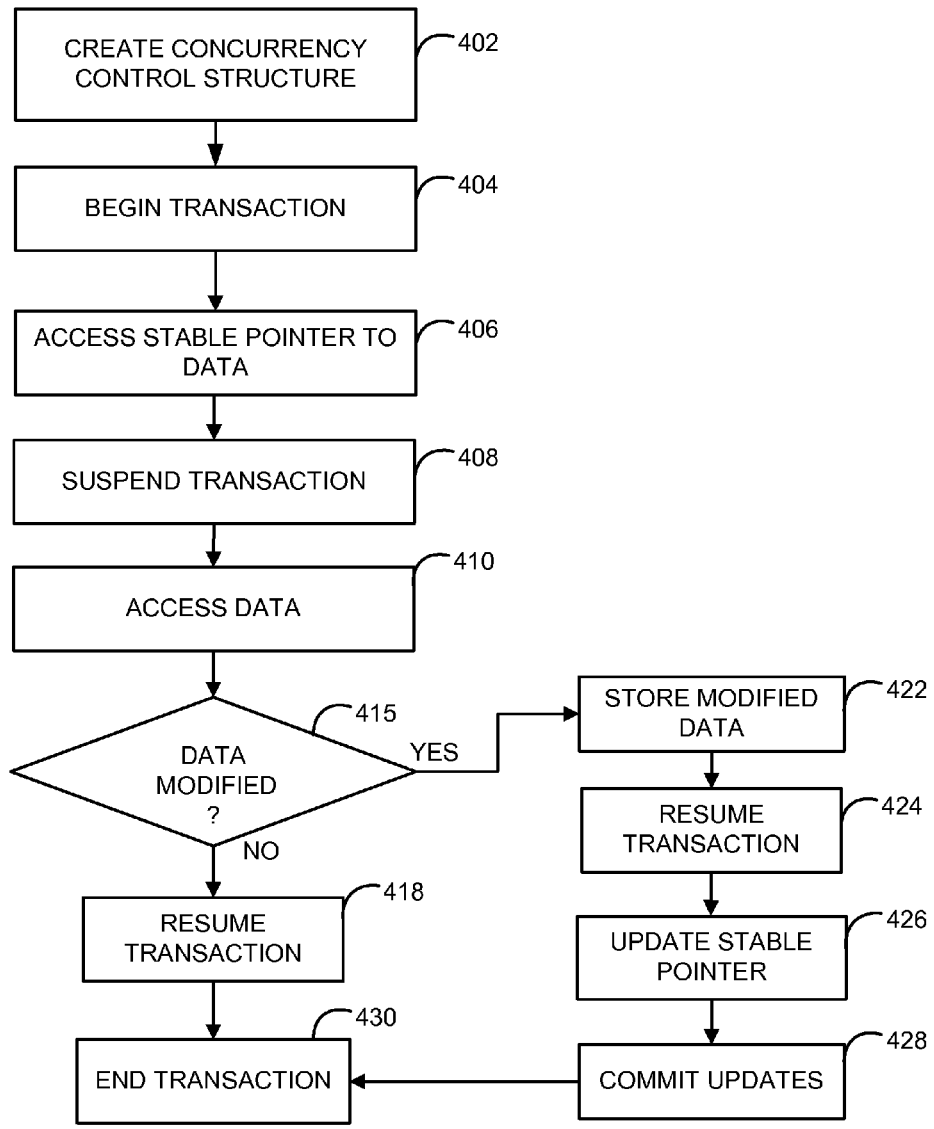
FIG. 4 is a flowchart illustrating transactional memory usage to accelerate multi-version concurrency control, in accordance with an embodiment of the disclosure.

FIG. 4 is a flowchart illustrating transactional memory usage to accelerate multi-version concurrency control, in accordance with an embodiment of the disclosure. In various embodiments, multi-version application 210 may create a concurrency control structure for its shared data records 130, at 402, which includes stable pointers to the shared data records 130. In various embodiments, the concurrency control structure may include, LIDs 110, RIDs 120, 121 and translate tables 150 in which the cRIDs 120 and uRIDs 121 are the stable pointers to the shared data records 130. In various embodiments, multi-version application 210 may begin a transactional region, at 404, to read or update one or more of the shared data records 130. The transactional region may include instructions to access, at 406, the stable pointers 120, 121 to the desired version of the shared data records 130. The transactional memory enabled CPU 214 may load the accessed stable pointers 120, 121 into transactional memory 218. The transactional region may be suspended, at 408, with, for example an included transaction suspend instruction, to prevent CPU 214 from loading any further accessed data into transactional memory 218. At this point the transactional region may include instructions to access, at 410, the shared data records 130. Because the transaction has been suspended, CPU 214 may not load the accessed data records 130 into transactional memory 218.

The transactional region initiated by the application 210 may be an update transaction, which includes instructions to modify the data records 130 accessed, or may be a read transaction, which simply includes instructions to read a snapshot version of the data records 130. The stable pointer 120, 121 may be included in transactional memory 218 for either type of transaction, enabling CPU 214 to recognize conflicts that arise on the stable pointers 120, 121 and abort transactions as necessary.

Once the transaction is suspended, the transactional region may include instructions to modify the accessed data records 130, as determined at 415, without loading the modified data record 130D into transactional memory 218. The transactional region may include instructions that utilize copy-on-write protocol to ensure the modified data record 130D is stored, at 422, into a different location in memory than the accessed data record 130.

The transactional region may, at 424, be resumed with, for example an included transaction resume instruction, to allow CPU 214 to once again load accessed data into transactional memory 218. The transactional region may include instructions to update, at 426, the stable pointer 120, 121 to point to the memory location of the modified data record 130D, causing CPU 214 to modify the updated stable pointer 120, 121 in transactional memory 218. The transactional region may also include instructions to, at 428, commit the changes made to the data record 130D, causing the CPU 214 to abort any other concurrent transactions whose transactional memory 218 includes the stable pointer 120, 121. The transactional region may, at 430, end.

For a transactional region whose instructions do not modify the accessed data records 130, as determined at 415, the transactional region may include instructions to, at 418, resume the transaction, allowing CPU 214 to load subsequently accessed data into transactional memory 218. The transactional region may, at 430, end.

If the transactional region ends successfully, any read data records 130 remain unchanged and any modified data records 130 were changed atomically. An application 210 whose transaction aborts due to stable pointer 120, 121 conflicts in transactional memory 218, may retry the transaction or utilize alternate concurrency controls, such as locks, to serialize access to the shared data 130.

Figure 5:
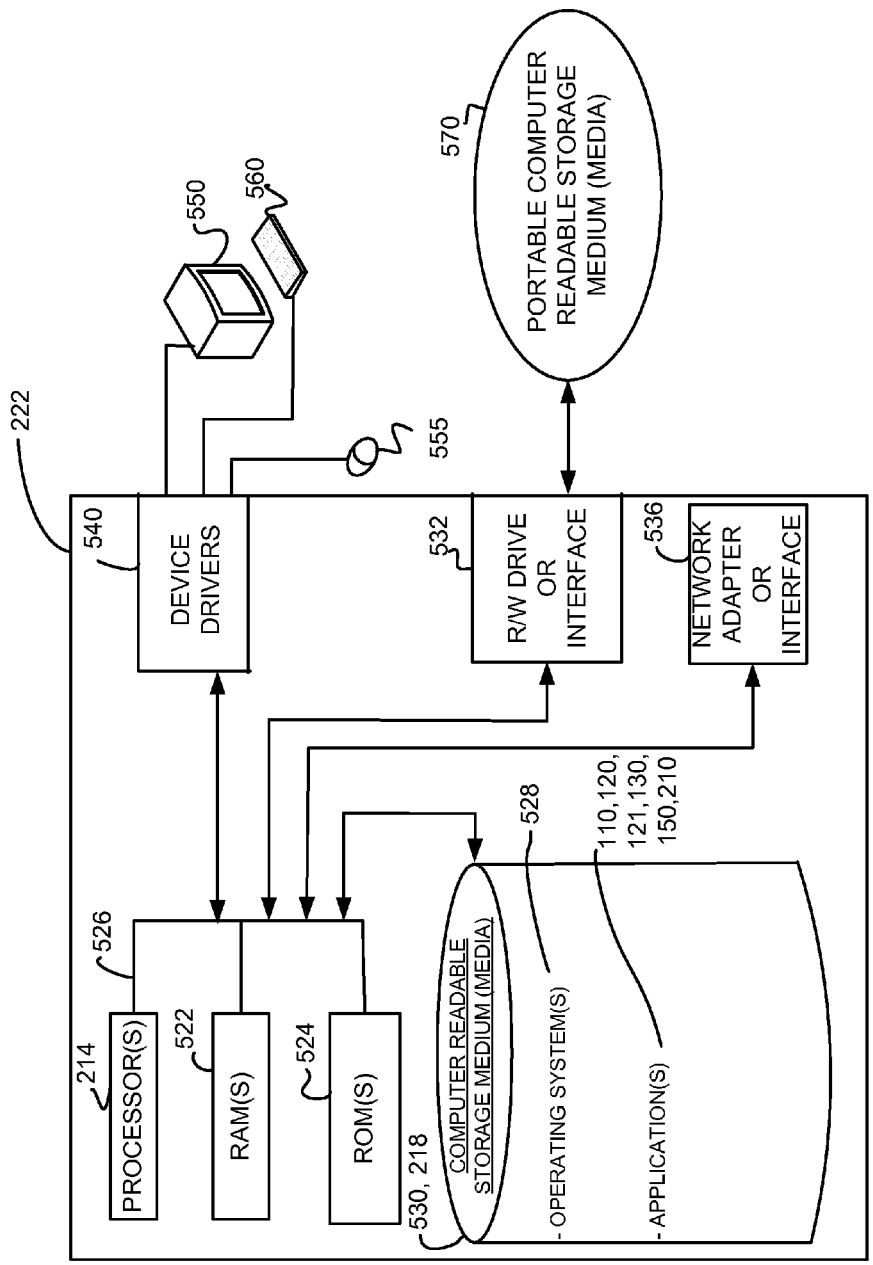
FIG. 5 depicts a block diagram of components of a computing device, in accordance with an embodiment of the disclosure.

FIG. 5 depicts a block diagram of components of computing device 222 of FIG. 2, in accordance with an embodiment of the disclosure. It should be appreciated that FIG. 5 provides only an illustration of one implementation and does not imply any limitations with regard to the environments in which different embodiments may be implemented. Many modifications to the depicted environment may be made.

Computing device 222 can include one or more processors 214, one or more computer-readable RAMs 522, one or more computer-readable ROMs 524, one or more computer readable storage medium 530, with transactional memory 218, device drivers 540, read/write drive or interface 532, and network adapter or interface 536, all interconnected over a communications fabric 526. Communications fabric 526 can be implemented with any architecture designed for passing data and/or control information between processors (such as microprocessors, communications and network processors, etc.), system memory, peripheral devices, and any other hardware components within a system.

One or more operating systems 528, applications 210, LIDs 110, RIDs 120, 121, data records 130, and translate tables 150 are stored on one or more of the computer-readable storage medium 530 for execution by one or more of the processors 214 via one or more of the respective RAMs 522 (which typically include cache memory). In the illustrated embodiment, each of the computer readable storage medium 530, 218 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 222 can also include a R/W drive or interface 532 to read from and write to one or more portable computer readable storage medium 570. Applications 210, LIDs 110, RIDs 120, 121, data records 130, and translate tables 150 can be stored on one or more of the portable computer readable storage medium 570, read via the respective R/W drive or interface 532, and loaded into the respective computer readable storage medium 530.

Computing device 222 can also include a network adapter or interface 536, such as a TCP/IP adapter card or wireless communication adapter (such as a 4G wireless communication adapter using OFDMA technology). Applications 210, LIDs 110, RIDs 120, 121, data records 130, and translate tables 150 can be downloaded to the computing device from an external computer or external storage device via a network (for example, the Internet, a local area network or other, wide area network or wireless network) and network adapter or interface 536. From the network adapter or interface 536, the programs are loaded into the computer readable storage medium 530. The network may comprise copper wires, optical fibers, wireless transmission, routers, firewalls, switches, gateway computers, and/or edge servers.

Computing device 222 can also include a display screen 550, a keyboard or keypad 560, and a computer mouse or touchpad 555. Device drivers 540 interface to display screen 550 for imaging, to keyboard or keypad 560, to computer mouse or touchpad 555, and/or to display screen 550 for pressure sensing of alphanumeric character entry and user selections. The device drivers 540, R/W drive or interface 532, and network adapter or interface 536 can comprise hardware and software (stored in computer readable storage medium 530 and/or ROM 524).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for accelerating multi-version concurrency control using a transactional memory enabled processor, the method comprising:
    providing a multi-version concurrency database, configured for:
        multiple versions of a shared data record stored on a computer readable storage medium, wherein the multiple versions include committed data records and can include modified but not yet committed data records;
        version dependent record identifiers, stored on the computer readable storage medium, pointing to the storage locations of the multiple versions of the data records; and
        a logical pointer, stored in a translation table on the computer readable storage medium, pointing to the data record by which an access request to a version of the data record is translated, via the version dependent record identifiers, to a storage location of the requested version of the data record;
    beginning, by a computer, a transactional execution;
    responsive to beginning the transactional execution, accessing, by the computer, a shared data record in the multi-version concurrency database, via the logical pointer for the shared data record stored in the translation table, and loading into transactional memory storage, by the computer, the version dependent record identifier for the committed version of the shared data record;
    marking as part of the transactional execution write set the version dependent record identifier for the committed version of the shared data record that is loaded into the transactional memory;
    responsive to loading the version dependent record identifier for the committed version of the shared data record into the transactional memory storage, suspending, by the computer, transactional execution;
    reading, by the computer, the committed version of the shared data record, whereby the committed version of the shared data record is not read into the transactional memory and is not marked as part of the transactional execution write set;
    updating, by the computer, the read committed version of the shared data record;
    storing the updated committed version of the shared data record using copy-on-write, whereby the updated shared data record is stored on the computer readable storage medium as an updated but not yet committed version of the data record in a location pointed to by an associated version dependent record identifier;
    responsive to storing the updated committed version of the shared data record, resuming by the computer, transactional execution;
    successfully completing the transaction; and
    performing, by the computer, an atomic update of the shared data record on the computer readable storage medium by updating the version dependent record identifier for the committed version of the shared data record to correspond to the version dependent record identifier associated with the updated but not yet committed version of the data record stored to the computer readable storage medium.

2. The method according to claim 1, wherein the atomic update of shared data occurs within a transaction.

3. The method according to claim 1, wherein suspend and resume transaction instructions are inserted in a transaction by a compiler.

4. A computer program product for accelerating multi-version concurrency control using a transactional memory enabled processor, the computer program product comprising one or more computer readable storage medium and program instructions stored on at least one of the one or more computer readable storage medium, the program instructions comprising:
    program instructions to begin a transactional execution;
    program instructions to, responsive to beginning the transactional execution, access, by the computer, a shared data record in a multi-version concurrency database, via a logical pointer for the shared data record stored in the translation table, and load into transactional memory storage, by the computer, a version dependent record identifier for the committed version of the shared data record;
    program instructions to mark as part of the transactional execution write set the version dependent record identifier for the committed version of the shared data record that is loaded into the transactional memory;
    program instructions to, responsive to loading the version dependent record identifier for the committed version of the shared data record into the transactional memory storage, suspend transactional execution;
    program instructions to read the committed version of the shared data record, whereby the committed version of the shared data record is not read into the transactional memory and is not marked as part of the transactional execution write set;

program instructions to update, by the computer, the read committed version of the shared data record;

program instructions to store the updated committed version of the shared data record using copy-on-write, whereby the updated shared data record is stored on the computer readable storage medium as an updated but not yet committed version of the data record in a location pointed to by an associated version dependent record identifier;

program instructions to, responsive to storing the updated committed version of the shared data record, resume transactional execution;

program instructions to successfully complete the transaction; and program instructions to perform an atomic update of the shared data record on the computer readable storage medium by updating the version dependent record identifier for the committed version of the shared data record to correspond to the version dependent record identifier associated with the updated but not yet committed version of the data record stored to the computer readable storage medium.

5. The computer program product according to claim 4, wherein the atomic update of shared data occurs within a transaction.

6. A computer system accelerating multi-version concurrency control using a transactional memory enabled processor, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:

program instructions to begin a transactional execution;

program instructions to, responsive to beginning the transactional execution, access, by the computer, a shared data record in a multi-version concurrency database, via a logical pointer for the shared data record stored in the translation table, and load into transactional memory storage, by the computer, a version dependent record identifier for the committed version of the shared data record;

program instructions to mark as part of the transactional execution write set the version dependent record identifier for the committed version of the shared data record that is loaded into the transactional memory;

program instructions to, responsive to loading the version dependent record identifier for the committed version of the shared data record into the transactional memory storage, suspend transactional execution;

program instructions to read the committed version of the shared data record, whereby the committed version of the shared data record is not read into the transactional memory and is not marked as part of the transactional execution write set;

program instructions to update, by the computer, the read committed version of the shared data record;

program instructions to store the updated committed version of the shared data record using copy-on-write, whereby the updated shared data record is stored on the computer readable storage medium as an updated but not yet committed version of the data record in a location pointed to by an associated version dependent record identifier;

program instructions to, responsive to storing the updated committed version of the shared data record, resume transactional execution;

program instructions to successfully complete the transaction; and program instructions to perform an atomic update of the shared data record on the computer readable storage medium by updating the version dependent record identifier for the committed version of the shared data record to correspond to the version dependent record identifier associated with the updated but not yet committed version of the data record stored to the computer readable storage medium.

7. The computer system according to claim 6, wherein the atomic update of shared data occurs within a transaction.

8. The computer system according to claim 6, wherein suspend and resume transaction instructions are inserted in a transaction by a compiler.

* * * * *